US007942632B2

(12) United States Patent
Lord et al.

(10) Patent No.: US 7,942,632 B2
(45) Date of Patent: May 17, 2011

(54) VARIABLE-SHAPE VARIABLE-STAGGER INLET GUIDE VANE FLAP

(75) Inventors: Wesley K. Lord, South Glastonbury, CT (US); Om P. Sharma, South Windsor, CT (US); Christopher Dye, South Windsor, CT (US); Gabriel L. Suciu, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1000 days.

(21) Appl. No.: 11/765,463

(22) Filed: Jun. 20, 2007

(65) Prior Publication Data

US 2008/0317587 A1 Dec. 25, 2008

(51) Int. Cl.
*F01D 17/16* (2006.01)

(52) U.S. Cl. ........................................ 415/156; 415/160

(58) Field of Classification Search .................. 415/156, 415/159, 160, 12; 416/240
See application file for complete search history.

(56) References Cited

U.S. PATENT DOCUMENTS

| | | | | | |
|---|---|---|---|---|---|
| 3,042,371 | A | * | 7/1962 | Fanti | 415/12 |
| 3,237,918 | A | * | 3/1966 | Le Bell et al. | 415/156 |
| 3,563,669 | A | * | 2/1971 | Hockert et al. | 415/160 |
| 3,723,021 | A | * | 3/1973 | Bartholomew | 415/156 |
| 4,022,540 | A | * | 5/1977 | Young | 415/160 |
| 5,472,314 | A | * | 12/1995 | Delonge et al. | 415/156 |
| 5,806,303 | A | | 9/1998 | Johnson | |
| 5,809,772 | A | | 9/1998 | Giffin, III et al. | |
| 5,961,278 | A | | 10/1999 | Dorais et al. | |
| 5,988,890 | A | | 11/1999 | Uematsu et al. | |
| 6,102,329 | A | | 8/2000 | Guinan et al. | |
| 6,438,941 | B1 | | 8/2002 | Elliott et al. | |
| 6,532,731 | B2 | | 3/2003 | Springer | |
| 6,684,626 | B1 | | 2/2004 | Orlando et al. | |
| 6,711,887 | B2 | | 3/2004 | Orlando et al. | |
| 6,729,575 | B2 | | 5/2004 | Bevilaqua | |
| 6,763,652 | B2 | | 7/2004 | Baughman et al. | |
| 6,763,653 | B2 | | 7/2004 | Orlando et al. | |
| 6,763,654 | B2 | | 7/2004 | Orlando et al. | |
| 6,901,739 | B2 | | 6/2005 | Christopherson | |
| 7,004,720 | B2 | | 2/2006 | Synnott et al. | |
| 7,114,920 | B2 | | 10/2006 | Synnott | |
| 7,134,271 | B2 | | 11/2006 | Baughman et al. | |
| 2005/0047942 | A1 | | 3/2005 | Grffin, III | |
| 2006/0045728 | A1 | | 3/2006 | Martin et al. | |

FOREIGN PATENT DOCUMENTS

GB 2149022 A * 6/1985

OTHER PUBLICATIONS

Smith, Hubert, The Illustrated Guide to Aerodynamics, 1992, TAB Books, Second Edition, pp. 91-93 and 110-112.*

* cited by examiner

*Primary Examiner* — Richard Edgar
(74) *Attorney, Agent, or Firm* — Carlson Gaskey & Olds PC

(57) ABSTRACT

A variable shape inlet guide vane (IGV) system includes a variable-shape IGV flap with a flexible portion that enables the desired spanwise distribution of Cx, alpha, and beta at a fan rotor inlet. An actuation system that rotates a root section of the variable-shape IGV flap to flex the flexible portion such that the twisted shape of the flap can reverse rather symmetrically during actuation from max open to max closed.

15 Claims, 6 Drawing Sheets

VARIABLE-SHAPE VARIABLE-STAGGER INLET GUIDE VANE FLAP

BACKGROUND OF THE INVENTION

The present invention relates to a gas turbine engine.

Low bypass ratio gas turbine engines include fan sections that are often configured with variable-stagger inlet guide vanes (IGVs). Conventional IGVs are typically disposed as a single stage of articulated airfoils (about a radial axis) located forward of the fan rotor blades of the fan section. Conventional IGVs provide a relatively flat fan inlet relative Mach number and fan exit (Pt) profile for increased design point performance, increased off-design partial-speed operability and flutter margin.

The IGVs typically have 20 degrees of twist from root to tip. At the design point stagger angle setting, this twist distribution provides an IGV exit flow with coswirl at tip and counterswirl at root relative to the fan rotor rotation direction. When this twist distribution is staggered to ~50 degrees closed at partial-speed conditions, there may be significant spanwise flow redistribution such that the tip region of the annulus may have a relatively low axial velocity (Cx) and an associated undesirable high positive incidence at the fan rotor tip section.

SUMMARY OF THE INVENTION

A variable shape inlet guide vane (IGV) system according to the present invention provides a variable-shape IGV flap having a flexible portion with a desired spanwise distribution of Cx, alpha, and beta at a fan rotor inlet. The flexible portion of the flap is constructed from compliant material such as silicon rubber which may also incorporate internal stiffening fibers or filaments. An actuation system rotates a root section of the IGV flap through a stagger angle range to provide a significant closed position at partial-speed condition in comparison to the tip section to flow towards the tip. Thus, the shape of the IGV flap is twisted rather symmetrically during actuation from max open to max closed.

The present invention therefore provide an IGV flap with increased partial-speed operability and flutter margin, thus avoiding fan rotor mistuning at particular operational conditions.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
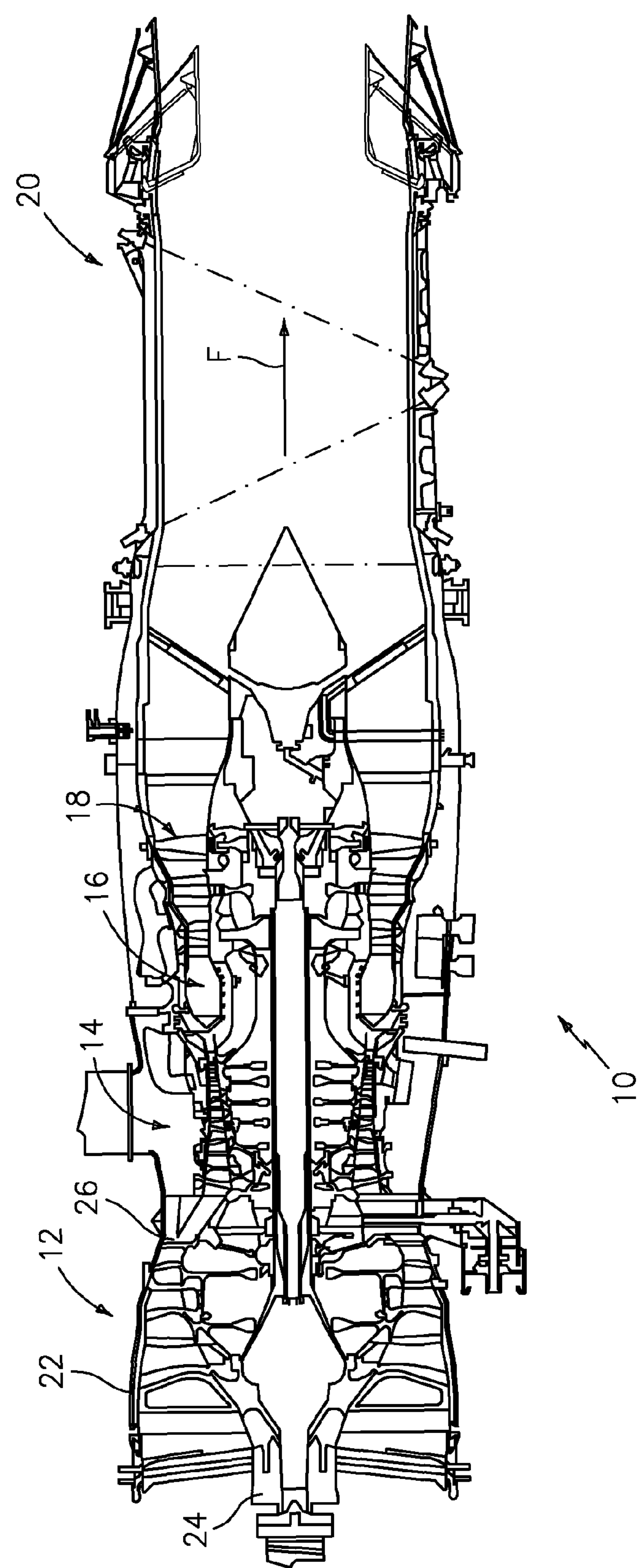
FIG. 1 is a general perspective view an exemplary gas turbine engine embodiment for use with the present invention.

FIG. 1 schematically illustrates a gas turbine engine 10 which generally includes a fan section 12, a compressor section 14, a combustor section 16, a turbine section 18, and a nozzle section 20 along a longitudinal axis X. The gas turbine engine 10 of the disclosed embodiment is a low bypass military-type gas turbine engine having a 3-stage fan, a 6-stage compressor, an annular combustor, a single stage high-pressure turbine, and a 2-stage low pressure turbine, however, various gas turbine engines will benefit from the present invention.

An outer engine structure 22 and an inner engine structure 24 at least partially define an annular secondary fan bypass flow path 26. It should be understood that various structure within the engine may be defined as the outer engine structure 22 and the inner engine structure 24 to define the fan bypass flow path 26 downstream of a fan rotor.

Figure 2:
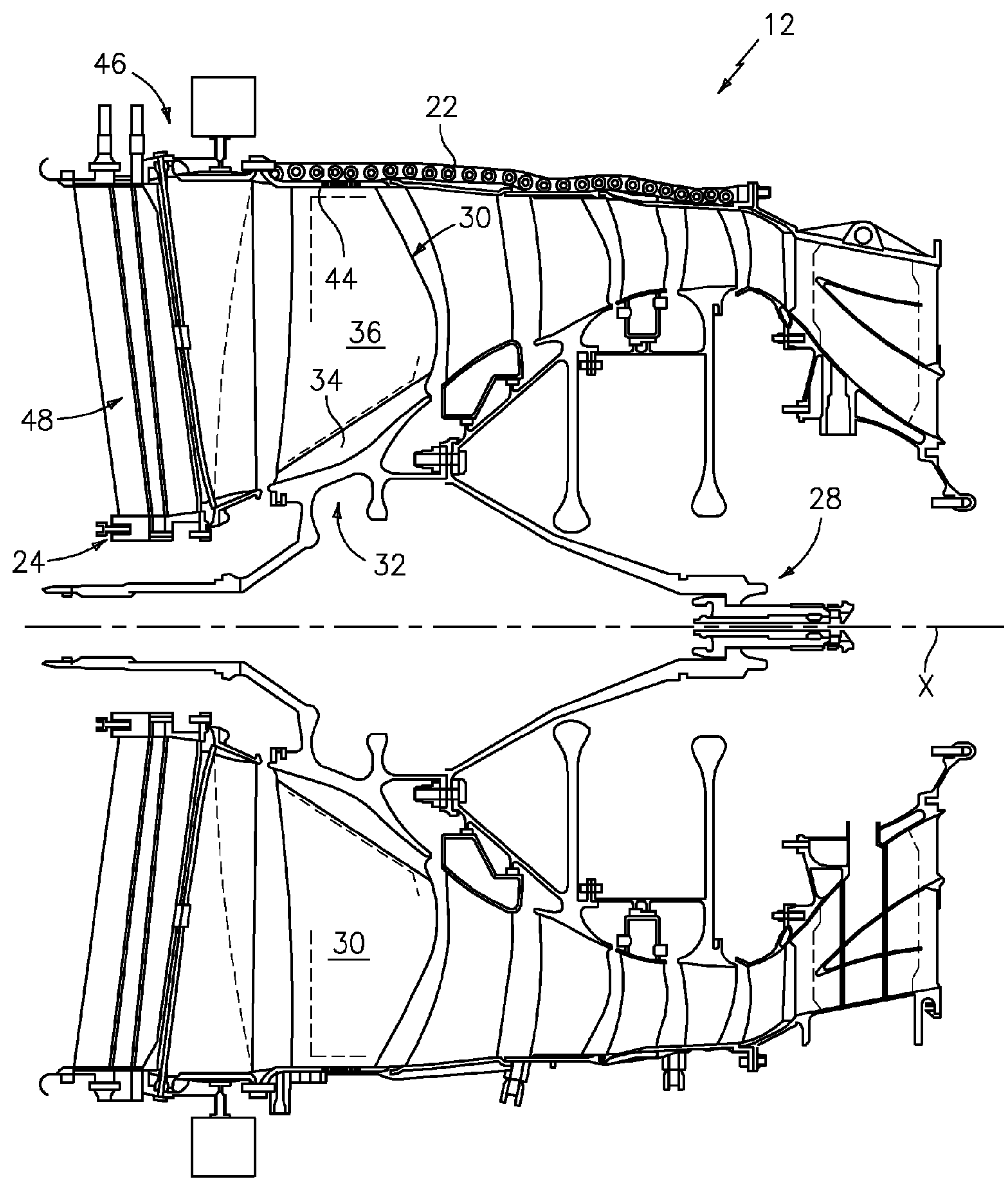
FIG. 2 is an expanded view of a fan bypass section of the gas turbine engine.

Referring to FIG. 2, a fan rotor assembly 28 upstream of the compressor section 14 includes a multiple of fan rotor blades 30 circumferentially disposed around a disk 32, each fan rotor blade 30 includes a root 34 and an airfoil 36. The airfoils 36 extend radially outward such that the outer edge of each airfoil 36 may be referred to as the blade tip 44.

Figure 3:
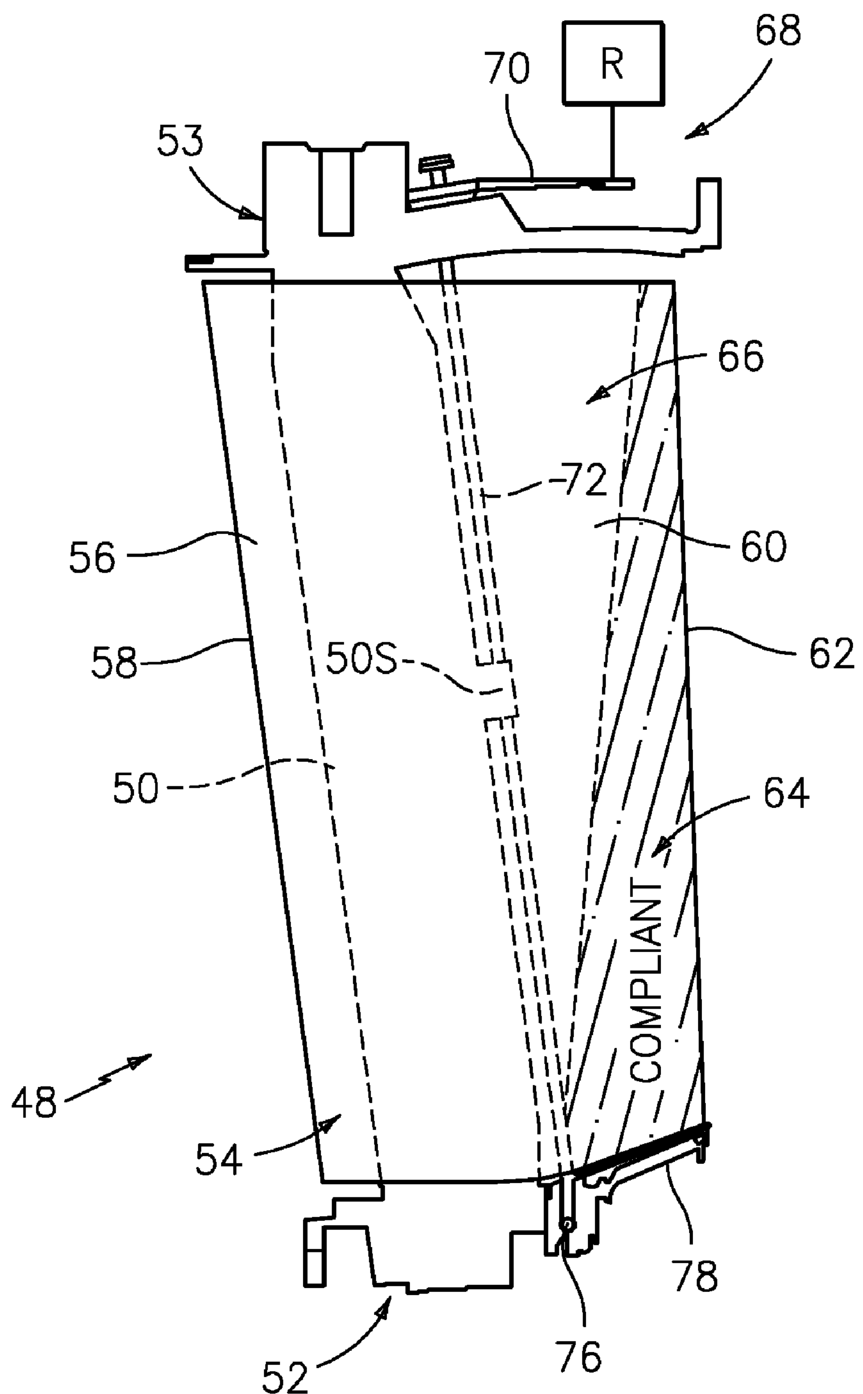
FIG. 3 is an expanded partial phantom view of one variable IGV flap of a variable shape inlet guide vane (IGV) system.

Upstream of the fan rotor blades 30 is a variable shape inlet guide vane (IGV) system 46 (also illustrated in FIG. 3). It should be understood that the IGV system 46 is located forward of a first stage of the fan section 12. The IGV system 46 includes a multiple of variable IGV flaps 48 circumferentially mounted between the outer engine structure 22 and the inner engine structure 24.

Referring to FIG. 3, each variable-shape IGV flap 48 includes a support strut 50 which extends between an inner support 52 and an outer support 53. The outer support 53 is attachable to the outer engine structure 22 and the inner support 52 is attachable to the inner engine structure 24 (FIG. 2) to provide support within the inlet of the engine 10. Each support strut 50 is at least partially surrounded by an airfoil 54 which defines a leading section 56 with a leading edge 58 generally forward of the strut 50 and a trailing section 60 with a trailing edge 62 generally aft of the support strut 50.

The airfoil 54 includes a flexible portion 64 which is movable relative a fixed section 66. The flexible portion 64 forms at least part of the trailing section 60. In one disclosed embodiment, the flexible portion 64 spans the entire trailing edge 62. The flexible portion 64 may be constructed from compliant material such as silicon rubber which may also incorporate internal stiffening fibers or filaments. It should be understood that various flexible or rigid, as the movable portion may alternatively be rigid, structures may be utilized with the present application.

An actuator system 68 includes an actuator such as an outer diameter unison ring (illustrated schematically at R) which rotates an actuator arm 70 and an actuator rod 72 which passes through the airfoil 54, the inner support 52 and the outer support 53. The actuator rod 72 is supported mid-span by a mid-span support 50S which extends from the support strut 50. An inner segment of the actuator rod is supported at an inner diameter pivot 76 which also supports an inner diameter rotating arm 78. The actuator rod 70 rotates the inner diameter rotating arm 78 which is attached to the flexible portion 64. The flexible portion 64 in one disclosed embodiment being triangular in shape with an inner diameter segment axially spanning the inner diameter rotating arm 78.

Figure 4A:
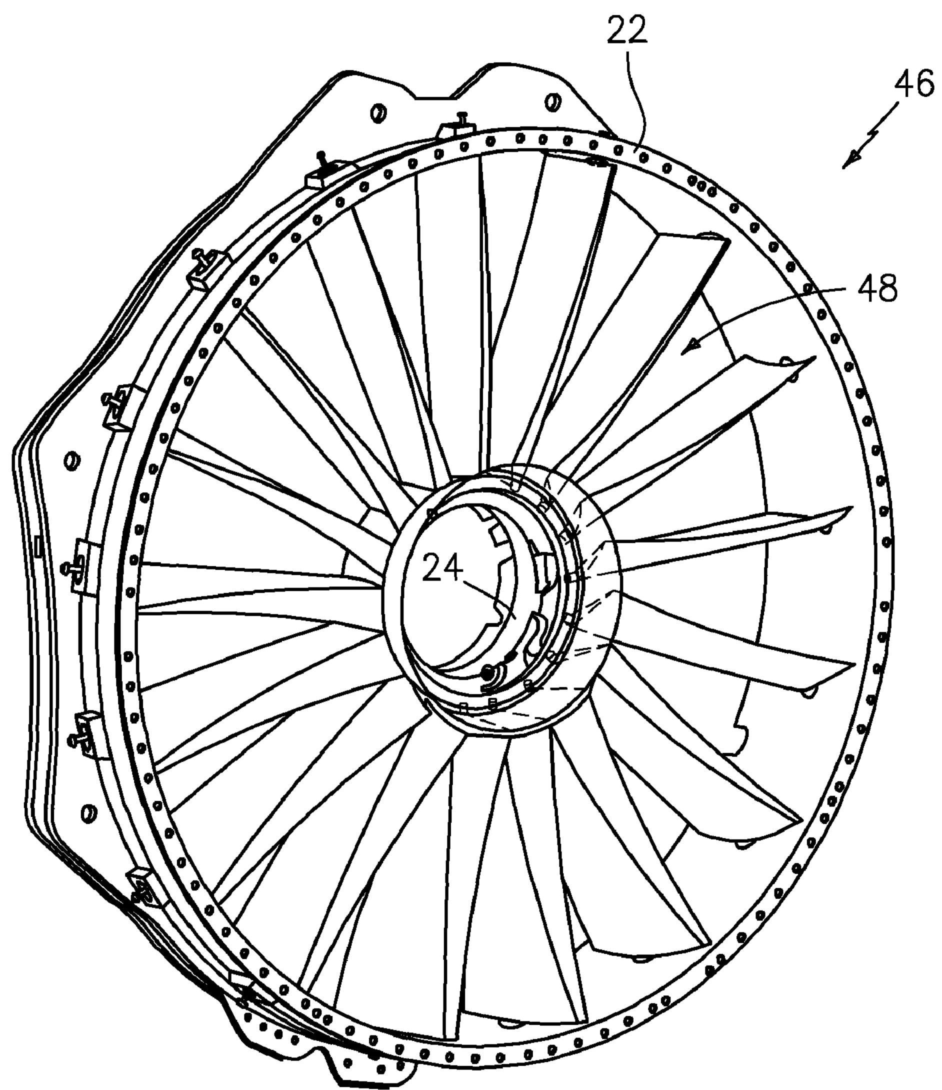
FIG. 4A is a perspective view of the variable shape inlet guide vane (IGV) system in a first position.
Figure 4B:
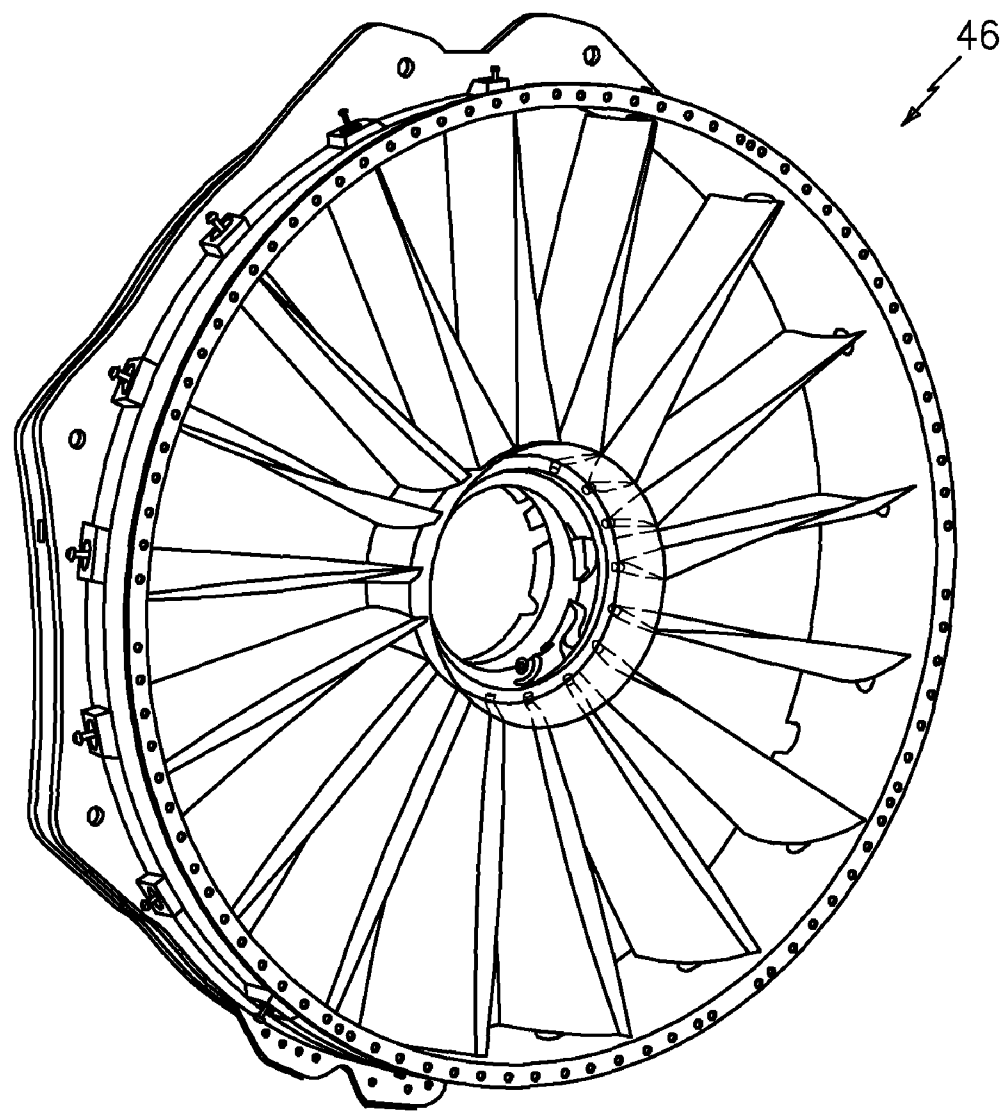
FIG. 4B is a perspective view of the variable shape inlet guide vane (IGV) system in a second position.

In operation, the actuator rod 72 carries actuator torque to the inner diameter rotating arm 78 to resiliently flex the flexible portion 64 between a first position (FIG. 4A) and a second position (FIG. 4B). The flexible portion 64 may be located at essentially an infinite number of positions between the first position (FIG. 4A) and the second position (FIG. 4B) such that the airfoil 54 is essentially varied to more closely match engine operational profiles at various speeds to minimize fan rotor mistuning. Thus, the flexible portion 64 of each variable-shape IGV flap 48 reverses the twist rather symmetrically during actuation from the first position (FIG. 5A) to the second position (FIG. 5B).

Figure 5A:
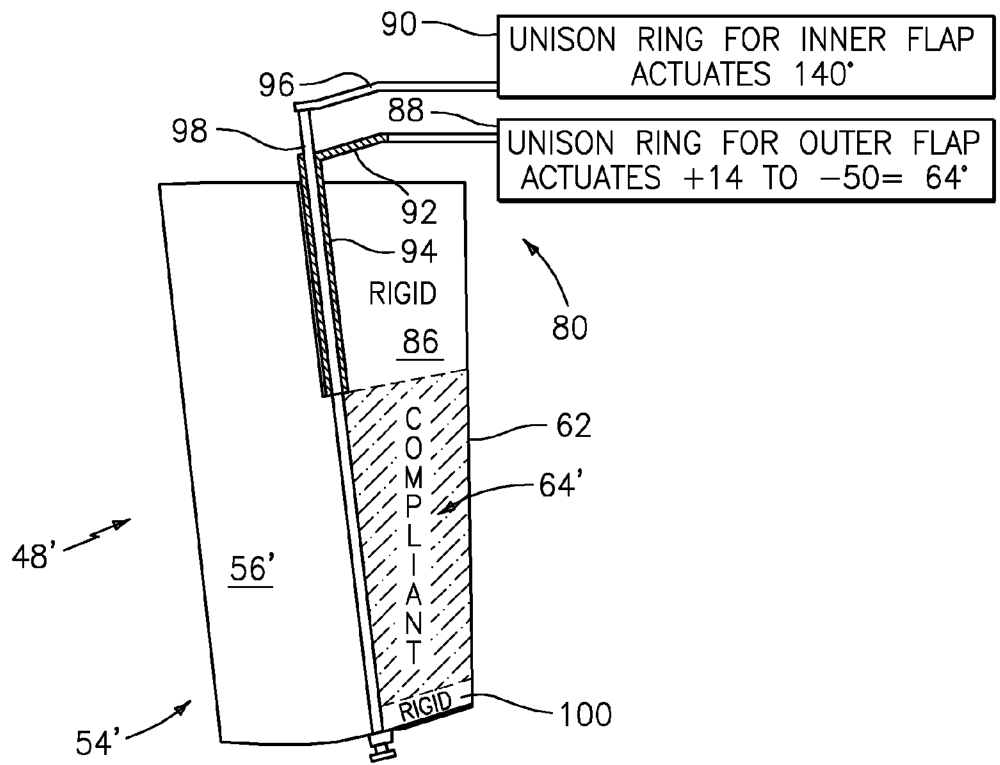
FIG. 5A is an expanded partial phantom view of another variable IGV flap of a variable shape inlet guide vane (IGV) system.
Figure 5B:
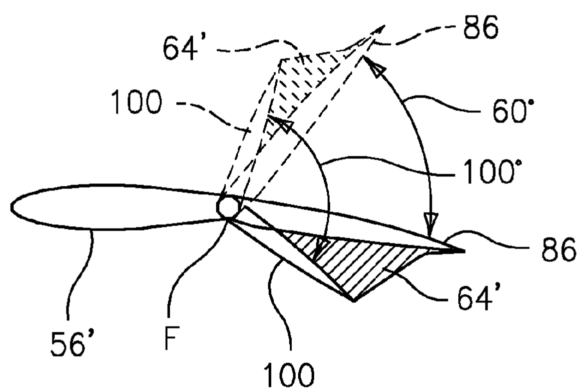
FIG. 5B is a top view of the variable IGV flap of FIG. 5A illustrating movement between a first position and a second position.

Referring to FIG. 5A, another embodiment, includes a flexible portion 64' which spans a rectilinear portion of the trailing edge 62 of a trailing section 86. An actuator system 80 includes a dual actuator such as a primary outer diameter unison ring (illustrated schematically at 88) and a secondary outer diameter unison ring (illustrated schematically at 90). The primary outer diameter unison ring 88 rotates a primary actuator arm 92 mounted to the trailing section 86 of the airfoil 54'. That is, the entire trailing section 86 of the airfoil 54' is pitched relative the fixed leading section 56' in response to rotation of the primary actuator rod 94 about a flap axis F.

The secondary outer diameter unison ring 90 rotates a secondary actuator arm 96 mounted to a secondary actuator rod 98 rotationally mounted through the primary actuator rod 94. The secondary actuator rod 98 is mounted to a secondary rotating arm 100 attached to the flexible portion 64'. The secondary actuator rod 98 rotates the inner diameter rotating arm 100 such that the flexible portion 64' is flexed relative the trailing section 86 of the airfoil 54' between a first position and a second position (FIG. 5B). Thus, the twisted shape of each variable-shape IGV flap 48' may be varied by the position of the trailing section 86 of the airfoil 54' relative the leading section 56' and the position of the flexible portion 64' relative the trailing section 86 such that there is a continuous spanwise alpha profile at the IGV exit.

It should be understood that relative positional terms such as “forward,” “aft,” “upper,” “lower,” “above,” “below,” and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An inlet guide vane flap comprising:

a leading section;

a trailing section which extends from said leading section, said trailing section having a flexible portion constructed from a compliant material which at least partially defines a trailing edge of said trailing section; and an actuator system having an actuator rod mounted through said airfoil, said actuator rod mounted to an inner diameter rotating arm attached to said flexible portion.

2. The inlet guide vane flap as recited in claim 1, wherein said flexible portion extends along an entire length of said trailing edge.

3. The inlet guide vane flap as recited in claim 2, wherein said flexible portion is triangular in shape.

4. The inlet guide vane flap as recited in claim 1, wherein said flexible portion is rectilinear in shape.

5. The inlet guide vane flap as recited in claim 1, wherein said compliant material is a silicone rubber.

6. The inlet guide vane flap as recited in claim 1, wherein said leading section and said trailing section define an airfoil, said leading section fixed relative to a support strut mounted between an outer engine structure and an inner support structure.

7. A fan section of a gas turbine engine comprising:

an outer engine structure;

an inner support structure; and an inlet guide vane flap includes a support strut mounted between said outer engine structure and said inner support structure, said inlet guide vane flap having a leading section and a trailing section that define an airfoil which surrounds said support strut, a trailing edge of said trailing section at least partially defined by a flexible portion of a compliant material; and an actuator system having an actuator rod mounted through said airfoil and at least partially supported by said support strut, said actuator rod mounted to an inner diameter rotating arm attached to said flexible portion adjacent to said inner support structure.

8. The fan section as recited in claim 7, wherein said leading section is fixed relative to said support strut.

9. The fan section as recited in claim 7, wherein said inlet guide vane flap is positioned upstream of a fan rotor blade.

10. The fan section as recited in claim 7, wherein said inlet guide vane flap is positioned upstream of a first stage of a fan section.

11. A fan section of a gas turbine engine comprising:

an outer engine structure;

an inner support structure;

a support strut mounted between said outer engine structure and said inner support structure; and an inlet guide vane flap mounted between said outer engine structure and said inner support structure, said inlet guide vane flap having a leading section and a trailing section that defines an airfoil which surrounds said support strut, said inlet guide vane flap having a flexible portion; and an actuator system having a primary actuator rod and a secondary actuator rod mounted through said airfoil, said primary actuator rod attached to said trailing section for movement of said trailing section relative said leading section, and said secondary actuator rod mounted to an inner diameter rotating arm attached to said flexible portion for movement of said flexible portion relative said trailing section.

12. A method of controlling a variable-shape IGV flap system comprising:

flexing a flexible trailing section constructed from a compliant material which at least partially defines a trailing edge relative a fixed leading section of an IGV flap; and rotating an actuator rod to rotate an inner diameter rotating arm attached to the flexible trailing portion to flex the flexible trailing portion relative to a rigid trailing section.

13. A method as recited in claim 12, further comprising:

flexing the flexible portion to twist the entire trailing edge of the IGV flap.

14. A method as recited in claim 12, further comprising:

rotating an actuator rod to rotate the rigid trailing section relative the fixed leading edge.

15. A method of controlling a variable-shape IGV flap system comprising the steps of:

rotating a primary actuator rod to rotate a rigid trailing section relative a fixed leading section,; and rotating a secondary actuator rod to rotate an inner diameter rotating arm attached to a flexible trailing section to flex the flexible trailing section relative to the rigid trailing section to twist a trailing edge of the IGV flap.

* * * * *